United States Patent [19]

Lin

[11] Patent Number: 5,328,508
[45] Date of Patent: Jul. 12, 1994

[54] METHOD FOR RAPID HYDRATION OF CEMENT AND IMPROVED CONCRETE

[75] Inventor: Tung D. Lin, Wilmette, Ill.

[73] Assignee: Lintek International, Inc., Wilmette, Ill.

[21] Appl. No.: 33,575

[22] Filed: Mar. 18, 1993

[51] Int. Cl.$^5$ ............................................. C04B 7/00
[52] U.S. Cl. ................................. 106/723; 106/672; 106/737; 106/738; 106/745; 106/817; 264/DIG. 43; 428/903.3; 501/155
[58] Field of Search ............... 501/155; 106/712, 723, 106/737, 738, 745, 817, 672; 264/DIG. 43; 428/903.3

[56] References Cited

U.S. PATENT DOCUMENTS 3,963,506  6/1976  Shutt et al. ........................... 501/131

FOREIGN PATENT DOCUMENTS 55148   7/1992  Taiwan .
330140  2/1972  U.S.S.R. .
582098  11/1977 U.S.S.R. .
816999  3/1981  U.S.S.R. .

OTHER PUBLICATIONS

*Design and Control of Concrete Mixtures*, (Twelfth edition) Portland Cement Association, ISNBNO-893-12-023-5, at p. 11 (1979).

Sidney Mindness and J. Francis Young, *Concrete*, 24, 78, 99 (1981).

A. M. Neville and J. J. Brooks, *Concrete Technology*, 177-190 (1987).

D. F. Orchard *Concrete Technology*, 276-293 (1962).

T. D. Lin and Nan Su, *Lunar Concrete Update*, Concrete International 73-76 (Nov. 1991).

News item quoting T. D. Lin, Concrete International (Jan. 1993).

*Primary Examiner*—Mark L. Bell
*Assistant Examiner*—Michael Marcheschi
*Attorney, Agent, or Firm*—Dressler, Goldsmith, Shore, Milnamow, Ltd.

[57] ABSTRACT

A method is described for making concrete from an initially dry mixture including Portland cement, a fine aggregate, and a coarse aggregate. The method is effective for curing mixtures which contain rubble, as well as for mixtures which contain primarily virgin aggregate. In the method, substantially dry steam is introduced to the mixture at elevated temperature and pressure. Air injection may be utilized to further increase the pressure. An improved concrete is also described. The concrete exhibits unexpectedly high compressive strength.

17 Claims, 2 Drawing Sheets

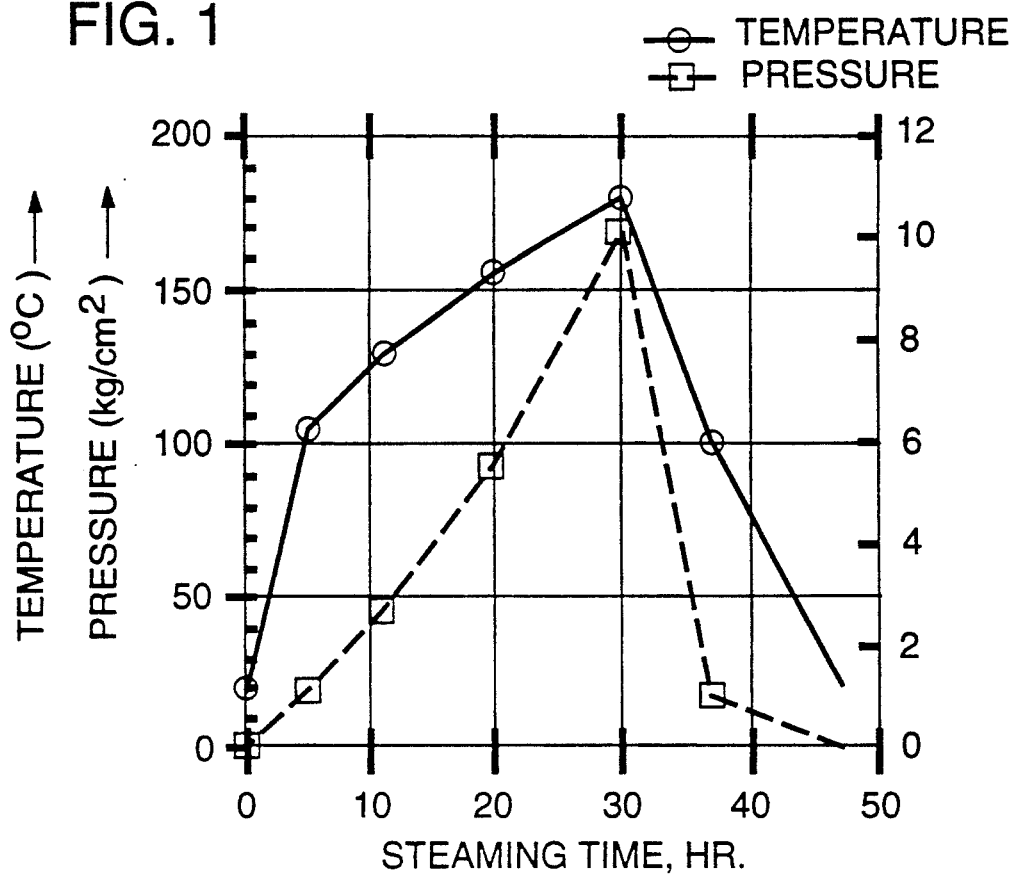
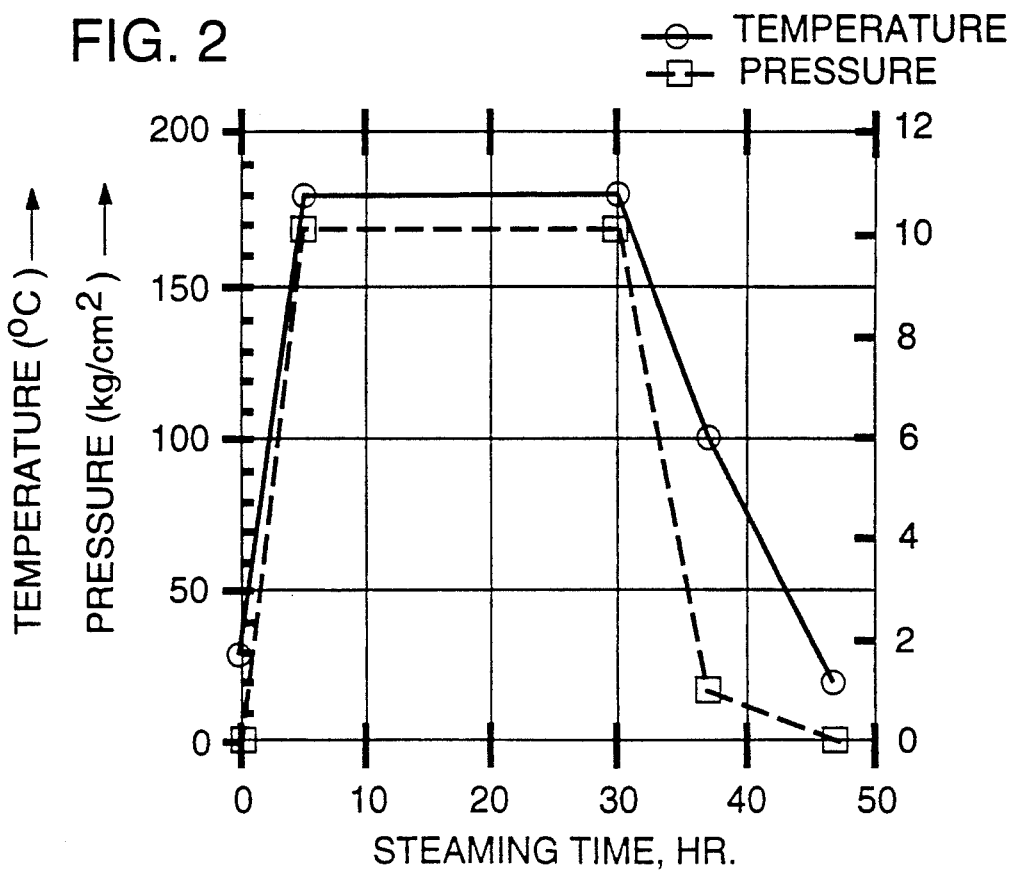

FIG. 3
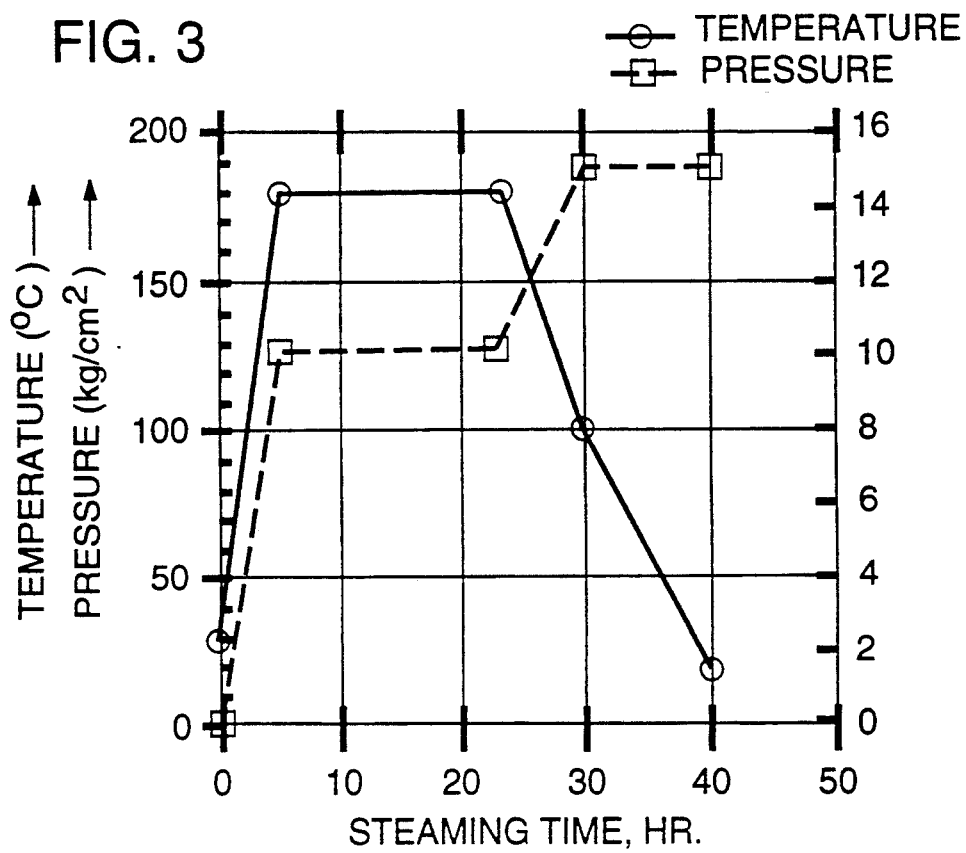
FIG. 4  A: STEAMING SENARIO 1
B: STEAMING SENARIO 2
C: STEAMING SENARIO 3
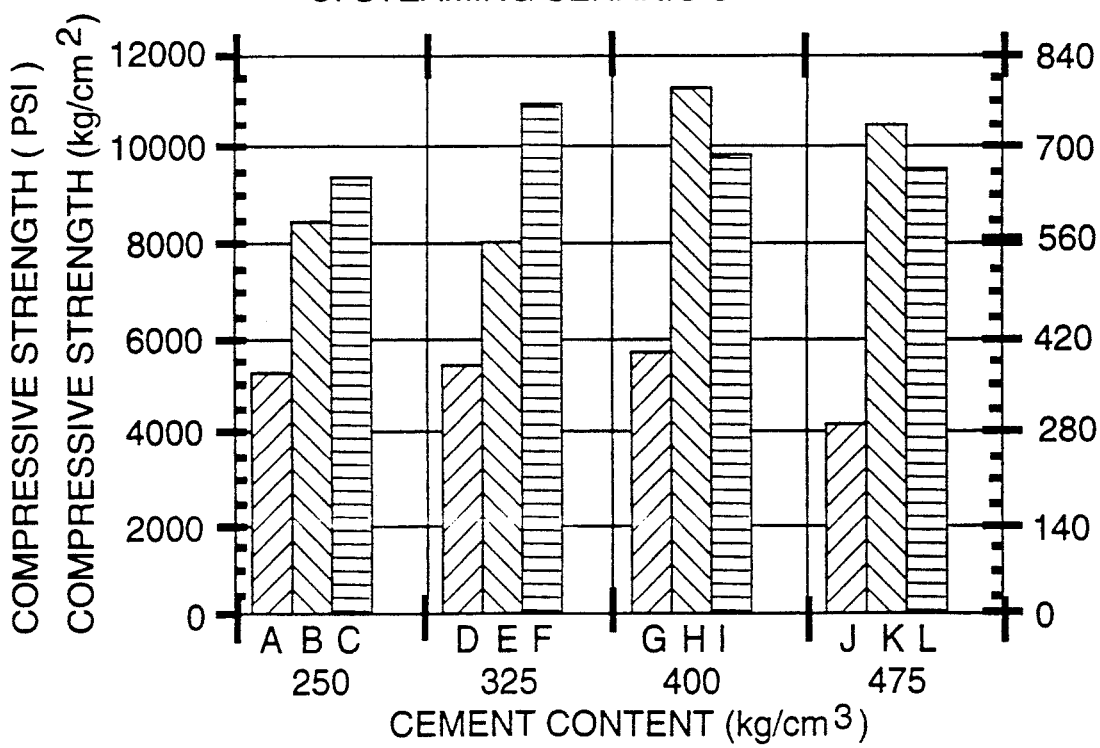

METHOD FOR RAPID HYDRATION OF CEMENT AND IMPROVED CONCRETE

TECHNICAL FIELD OF THE INVENTION

The invention is related to an improved method for rapid hydration of cement and also to an improved concrete produced by the method.

BACKGROUND OF THE INVENTION

Concrete is a versatile building material made by mixing cement, aggregate, and water in a proper proportion. Traditionally, the water is introduced in liquid phase and the concrete is cured in a moist condition for twenty-eight days to reach a design strength. See "Design and Control of Concrete Mixtures", Twelfth edition, Portland Cement Association, ISNBN 0-89312-023-5 at page 11 (1979). This procedure has been used for centuries and is still the dominant technology in concrete construction around the world today.

More recently, some manufacturers of precast concrete have reported mixing cement, aggregate, and liquid water to produce a wet mixture and, subsequently, contacting the wet mixture with steam in order to accelerate a curing process. In some cases, steaming of the wet mixture is reportedly followed by a relatively longer period of natural curing, which is said to produce a concrete which develops a useful design strength in a relatively short time.

It has been published that a mortar made from Portland cement and fine (virgin) aggregate exhibits a relatively high compressive strength when cured by contact with steam at greater than atmospheric pressure. For example, Republic of China (Taiwan) Patent No. 55,148 describes autoclaving a dry cement and sand mixture in the presence of steam for time periods in the range of 6 to 18 hours. Mortar cubes having desirably high compressive strengths are also described in that patent.

However, many industrial nations are currently in need of a practical method for recycling waste materials, particularly construction debris known as rubble. To date, concrete mixtures containing rubble are not commonly employed as building materials. Concrete containing recycled materials often exhibits relatively poor compressive strength, apparently as a result of weaker bond strengths at interfaces between cement paste and recycled materials used as aggregate.

Accordingly, a need exists for a method for producing stronger concrete from mixtures containing recycled materials. Similarly, a method for producing stronger concrete products, generally, from Portland cement and aggregate would be enthusiastically received by the construction community.

SUMMARY OF THE INVENTION

The invention provides an improved method for rapid hydration of cement which produces a concrete having relatively high compressive strength. In the method, a dry mixture of Portland cement, fine aggregate, and coarse aggregate is cured in the presence of steam at elevated temperature and pressure. The method is effective for curing mixtures which contain rubble, as well for curing mixtures which contain primarily virgin aggregate. The pressure is elevated by injecting steam or, alternatively, steam followed by air into a pressure vessel which holds the mixture.

In one aspect, the invention provides a method for making concrete from an initially dry mixture including Portland cement, a fine aggregate, and a coarse aggregate. For example, the fine aggregate can be sand and the coarse aggregate can be gravel. Substantially dry steam is introduced into the mixture and maintained in contact with the mixture at approximately saturation conditions. Preferably, the steam and the mixture are contacted in a well insulated pressure vessel in which relatively little liquid water comes into contact with the mixture. The steam and the mixture are maintained in contact for a time effective to hydrate substantially all of the cement, thereby curing the mixture.

Preferably, air is injected into contact with the mixture and also into contact with the steam. More preferably, the pressure on the mixture is increased by injecting air into a pressure vessel which holds the mixture. Sufficient air is injected and maintained in contact with the mixture to make a concrete having a compressive strength of at least about 69,000 kilonewtons per square meter ($kN/m^2$) which corresponds to about 10,008 pounds per square inch (psi).

In another aspect, the invention provides a method for recycling material which has been utilized previously for construction. A mixture including Portland cement, a fine aggregate, and a coarse aggregate which contains a substantial amount of a comminuted, recycled material is provided. The recycled material can be rubble, such as demolished brick or broken concrete. Substantially dry steam is introduced into the mixture and the steam is maintained in contact with the mixture until substantially all of the cement in the mixture is hydrated to produce a concrete having a compressive strength of at least about 35,000 $kN/m^2$ (5076 psi).

In a third aspect, the invention provides a concrete suitable for use as a building material. The concrete comprises hydrated Portland cement, a fine aggregate, and a coarse aggregate substantially composed of a comminuted, recycled material. The recycled material can be rubble, such as demolished brick or broken concrete. The Portland cement is bound to the fine aggregate and to the coarse aggregate. The concrete has a compressive strength of at least about 35,000 $kN/m^2$ (5076 psi).

In yet another aspect, the invention is a concrete suitable for use as a building material comprising a fine aggregate, a coarse aggregate, and a hydrated Portland cement. The cement is present in an amount in the range of about 250 to about 325 kilograms per cubic meter of concrete. The concrete has a compressive strength in the range of at least about 62,000 $kN/m^2$ (8992 psi).

BRIEF DESCRIPTION OF THE DRAWINGS

FIG. 1 is a graph presenting temperature and pressure as functions of time for a first steam cycle (steaming scenario 1) in accordance with the present invention.

FIG. 2 is a graph which shows the relationships of temperature and pressure with time for a second steam cycle (steaming scenario 2) in which the pressure and the temperature were maintained relatively constant for several hours.

FIG. 3 is a graph which traces temperature and pressure as functions of time for a third steam cycle (steaming scenario 3) in accordance with the present invention in which the pressure is elevated by injecting air, beginning at the point at which temperature starts to decrease.

FIG. 4 is a graph which shows the compressive strengths of twelve concrete samples, grouped according to cement content.

DETAILED DESCRIPTION OF THE INVENTION

The invention provides a method for making concrete from an initially dry mixture which includes Portland cement, fine aggregate, and coarse aggregate. The aggregates are, for example, sand, gravel, crushed stone, or pumice. Aggregates typically constitute about 60% to about 80% of the volume of the mixture and greatly influence the properties of the concrete. Preferably, the aggregates are substantially inert and, consequently, do not appreciably enter into chemical or physical reactions within the concrete after the concrete has hardened.

Fine aggregate is composed substantially of particles capable of passing through a 4.76 millimeter standard sieve (3/16-inch screen, U.S. Sieve Series No. 4 sieve). Preferably, no more than about 30% by weight of the fine aggregate is capable of passing through a 297 micron standard sieve (0.0117 inch screen U.S. Sieve Series No. 50 sieve). Coarse aggregate is defined as aggregate having particle sizes larger than about 4.76 millimeter (3/16 inch). For additional information regarding U.S. Sieve Series dimensions, see Perry's Chemical Engineer's Handbook, Table 21-6, McGraw-Hill Book Company, New York, USA (1984).

Portland cement is an inorganic hydraulic cement composed principally of particles which form relatively insoluble bonded aggregations of considerable strength when hydrated. Portland cements are ordinarily manufactured from raw mixes including a component such as calcium carbonate, clay or shale, and iron ore. The components are crushed, milled and subjected to a high temperature treatment known as pyroprocessing. The fused product of pyroprocessing, called clinkers, are ground and optionally mixed with additives, such as gypsum, to produce the Portland cement particles.

Generally, Portland cement contains about 75 wt. % calcium silicates, about 5 wt. % to about 10 wt. % per of calcium aluminates, about 5 wt. % calcium sulphate, about 1 wt. % or less of the oxides of sodium and potassium, about 2 wt. % to about 4 wt. % magnesium oxide and about 5 wt. % to about 10 wt. % calcium-alumina-iron compounds. These chemical compounds usually occur together in a natural raw material used in manufacturing the cement.

Portland cement particles contain significant proportions of mineral compounds, such as tri- and di-calcium silicates ($C_3S$ and $C_2S$, respectively), calcium aluminates ($C_3A$), and tetracalcium ferric aluminate ($C_4AF$) which are fused together in a disorderly structure. Herein, in accordance with conventional nomenclature used by cement chemists, the abbreviations C, S, A, and F stand for calcium oxide, silica, alumina, and ferric oxide, respectively.

In the present method, substantially dry steam is introduced into the mixture. Substantially dry steam contains less than 1% by weight of liquid phase water. Preferably, the steam is injected at a temperature equal to or greater than the saturated temperature. It is preferred that the steam is at most about 20° C. warmer than saturation temperature at the time of injection.

It is intended that the introduction of the steam and the contacting be performed so that a minimum of liquid water comes into contact with the mixture. For example, it is preferred that any pressure vessel which houses the mixture or any conduits which transport the steam be well insulated to avoid unnecessary heat loss and possible condensation of the steam. Similarly, liquid water that is formed should be removed from the vicinity of the mixture immediately by, for example, continuously operating drain lines.

When water comes into contact with the Portland cement, the water is taken into the crystal structure of the calcium silicates present, forming calcium hydroxide and calcium silicate hydrate gels (sometimes referred to as tobemorite gel). As the hydration proceeds, the concrete becomes stronger and harder. During hydration, calcium silicate hydrate products are formed such as tri-calcium silicate hydrate ($C_6S_2H_3$), calciochondrodite ($C_5S_2H$), alpha-dicalcium silicate hydrate ($C_2SH$), afwillite ($C_3S_2H_3$), foshagite ($C_4S_3SH$) and xonotlite ($C_5S_5H$). The calcium silicate hydrate products are collectively designated C—S—H gels.

In a conventional wet procedure, tri-calcium silicate, for example, can cause calcium oxide to partially dissolve in water that comes into contact with cement particles and to form calcium ions and hydroxyl ions in a process called hydrolysis. Hydrolysis is generally completed in the first 15 minutes of conventional wet mix cement hydration. See "Concrete," by Sidney Mindness and J. Francis Young, Printice-Hall, Inc., at page 78 (1981). Typically, a portion of the calcium ions and hydroxyl ions produced by hydrolysis subsequently form into calcium hydroxide (CH). The calcium hydroxide forms a crystal which can serve as an adhesive to bind adjacent aggregate particles. However, the bond formed by the calcium hydroxide crystal is significantly weaker than that formed by C—S—H gels. Traditional liquid phase hydration of wet mixtures typically produces about 20% calcium hydroxide crystal and about 80% C—S—H gels, although the exact proportion varies with the temperature and the amount of water used. Significantly, calcium hydroxide crystals which are formed in the first 15 minutes of conventional liquid phase hydration are not affected by subsequent steaming of the partially hydrated mixture.

The hydration of a dry mixture by substantially dry steam is quite different from that of conventional wet mix hydration by liquid phase water. During steaming, dry cement particles gain energy from collisions with energetic steam particles. Since the amount of condensed water is considerably less than that in the conventional wet mix procedure, the proportion of calcium hydroxide formed is relatively smaller. Accordingly, the proportion of C—S—H gels formed is relatively greater and the concrete produced is stronger.

Additionally, it is hypothesized that hydration by substantially dry steam permits steam molecules to diffuse into the interior portions of the cement particles. Inspection by electron microscope reveals that cement particles and hydrated cement pastes possess randomly distributed micropores having dimensions in the range of about 5 to about 360 Angstroms (Å). See "Concrete", by Sidney Mindness and J. Francis Young, Prentice-Hall, Inc., at page 99 (1981). Apparently, the micropores are too small for liquid water droplets to penetrate because the liquid is water constrained by surface tension. It is believed that liquid water is absorbed primarily on the surfaces of the cement particles, and that the liquid water forms thin films which may include hydration products on the surfaces and which retard further permeation by the water.

In contrast, steam molecules measure about 2.7 Å in diameter and, therefore, encounter relatively little difficulty in moving in and out of the 5 to 360 Å micropores. The steam molecules are not subject to such surface tension effects. The ability of steam molecules to reach interior portions of the cement particles is consistent with a relatively higher degree of hydration observed when hydration is accomplished by substantially dry steam, as compared to hydration by liquid water. Apparently, energetic steam particles diffuse to the interiors of the cement particles and partially condense to hydrate the particles substantially throughout their volumes in a relatively short time.

Preferably, steam is maintained in contact with the mixture at a temperature in the range of about 160° to about 180° C. so that the mixture is substantially hydrated in a time period in the range of about 10 to about 15 hours. When a mixture hydrated by the present method attains a maturity of in the range of about 5,000 to about 10,000 centigrade-hours, it is usually substantially hydrated. The base temperature for maturity herein is taken to be negative 11° C. Maturity is the integral of the difference between an actual curing temperature and the base temperature, with respect to time, over a finite period of time beginning at the onset of curing.

It is especially preferred that air be injected into contact with the mixture and with the steam. The air may be injected with additional steam to maintain the temperature of the mixture or, alternatively, injected with no additional steam. Preferably, injecting the air raises the pressure over the mixture to about 15 kilograms per square centimeter, thereby producing a concrete having a compressive strength of about 69,000 kN/cm$^2$ (10,008 psi), as measured by a Shimadze Universal Testing Machine that provides a controlled deflection at a strain rate of 0,030 millimeters per minute (0.0012 inches per minute).

The above-described method for making concrete may be practiced with a mixture including Portland cement, a fine aggregate, and a coarse aggregate substantially composed of a comminuted recycled material. The recycled material can be rubble, such as demolished brick or broken concrete. Moreover, unexpectedly high compressive strength has been observed for concrete made by the method from recycled material, as compared to concrete containing recycled material but made by previously known methods. For example, concrete having a compressive strength of at least about 35,000 kN/m$^2$ (5076 psi), and preferably at least about 38,000 kN/m$^2$ (5511 psi), can be prepared using recycled material as coarse aggregate. More specifically, the above-described method can hydrate a mixture containing comminuted broken concrete to produce a concrete having a compressive strength of at least about 41,000 kN/m$^2$ (5946 psi).

Significantly, a concrete made from a mixture containing recycled material and having a compressive strength of at least about 35,000 kN/m$^2$ (5076 psi) meter also had a water to cement ratio equal to or less than about 0.3 by weight. By way of comparison, traditional concrete made with the wet procedure often has a water to cement ratio of about 0.5 or higher. The water cement ratio of the dry mixed concrete was calculated from the weights of the mixture measured before and after steam was introduced. The entire increase in weight observed is attributed to water, and the associated water to cement ratio is based upon the weight of the initially dry mixture.

The concrete produced by the present invention comprises a fine aggregate, a coarse aggregate and a hydrated Portland cement which binds the aggregates together into a cohesive mass. The concrete preferably has a water to cement ratio equal to or less than about 0.3 by weight. Preferably, the hydrated Portland cement is present in an amount corresponding to the range of about 250 to about 325 kilograms per cubic meter of a dry precursor mixture, as measured before hydration. The precursor mixture is substantially composed of Portland cement and aggregates.

The following examples are presented to more fully communicate the invention.

EXAMPLE 1

A dry mixture including Portland cement, sand, and gravel was placed in a cube-shaped mold in three layers. The cube-shaped mold measured four inches on each side. Each of the layers was rodded twenty-five times to compact the mixture and to minimize variations in density. The mold had been weighed when empty to provide a tare weight. The weight of the filled mold was determined and recorded. Subsequently, the filled mold was placed in an autoclave. The autoclave was sealed to isolate its contents from the surrounding atmosphere.

Referring now to FIG. 1, injection of dry steam was initiated at "time 0" with the interior of the autoclave at atmospheric pressure and 20° C. Steam injection was continued over a period of thirty hours, during which period both the total pressure and the temperature within the autoclave increased to a maximum temperature of 180° C. and the corresponding pressure of 10.1 kg. per square centimeter. A small stream of condensate was withdrawn periodically from the bottom of the autoclave, which was insulated. After thirty hours steam injection was terminated. The temperature and the pressure within the autoclave declined as a result of natural cooling for the period thirty to forty-eight hours.

The autoclave was opened and the mold, now containing a hardened concrete cube, was removed from the autoclave and weighed. The concrete cube was removed from the mold and subjected to a test of compressive strength using a Shimadze Universal Testing Machine that provided a controlled deflection at a strain rate of 0.030 milimeters per minute (0.0012 inches per minute). The concrete cube, designated sample A, exhibited a compressive strength of 35,660 kN/m$^2$ (5,169 psi).

EXAMPLE 2

The procedure described in Example 1 above was repeated except that sufficient steam was injected over a period of about five hours to raise the internal pressure of the autoclave to 10.8 kilograms per square centimeter, producing an internal temperature of 168° C., as shown in FIG. 2. The internal pressure was maintained at 10.8 kilograms per square centimeter for twenty-five hours. At that time, steam injection was terminated and cooling by natural convection caused the temperature and the pressure to decrease over the next eighteen hours. The autoclave was opened and the hardened cube produced was determined to have a water to cement ratio of 0.23, based on the weight of the filled mold before and after steaming. The hardened cube, designated Sample B, tested at a compressive strength of 57,566 kN/m² (8,343 psi).

EXAMPLE 3

The procedure described Example 1 above was again performed, but this time steam was injected over a period of five hours to produce an internal pressure of 10.1 kilograms per square centimeter at a temperature of 180° C. Thereafter, additional steam was injected as required to maintain the pressure in the autoclave at 10.1 kilograms per square centimeter for a period of eighteen hours. Subsequently, steam injection was terminated and natural convective cooling caused the temperature in the autoclave to decline over the next seventeen hours. However, immediately after the steam injection was terminated, air was forced into the autoclave through use of a compressor to raise the internal pressure of the autoclave to 15.0 kilograms per square centimeter over a period of eight hours. Air was also introduced into the autoclave as necessary to maintain the internal pressure at 15.0 kilograms per square centimeter for an additional ten hours, while the temperature in the autoclave declined to 20° C. FIG. 3 shows the temperature and pressure data recorded during this procedure as functions of time.

The autoclave was opened and a hardened cube was removed from the mold. The hardened cube, designated Sample C, had a compressive strength of 63,570 kN/m² (9,213 psi).

EXAMPLE 4

The procedure described in Example 1 above was repeated, except that the mixture placed in the mold was made with a cement content of 325 kilograms of Portland cement per cubic meter of the mixture. The mixture was subjected to a steam cycle substantially identical to that depicted graphically in FIG. 1. A resulting hardened cube, designated as Sample D, tested at a compressive strength of 36,818 kN/m² (5,336 psi).

EXAMPLE 5

The procedure described in Example 2 above was performed, except that the mixture contained 325 kilograms of Portland cement per cubic meter of mixture. A hardened cube designated Sample E was produced which had a compressive strength of 55,214 kN/m² (8,002 psi). The hardened cube had a water to cement ratio of 0.24, based on the weight of the filled mold before and after steaming.

EXAMPLE 6

The procedure described in Example 3 above was repeated for a mixture having 325 kilograms of Portland cement per cubic meter of mixture. The resulting hardened cube, designated Sample F, had a water to cement ratio of 0.38 and a compressive strength of 75,065 kN/m² (10,879 psi).

EXAMPLE 7

The procedure described in Example 1 above was performed using a mixture having 400 kilograms of Portland cement per cubic meter of mixture. The resulting hardened cube had a compressive strength of 38,592 kN/m² (5,593 psi) and was designated Sample G.

EXAMPLE 8

A mixture containing 400 kilograms of Portland cement per cubic meter of mixture was subjected to the procedure described in Example 2 above. A hardened cube designated Sample H was produced having a water to cement ratio of 0.21 and a compressive strength of 76,873 kN/m² (11,141 psi).

EXAMPLE 9

The procedure described in Example 3 above was performed with a mixture having 400 kilograms of Portland cement per cubic meter of mixture. A hardened cube was produced which had a water to cement ratio of 0.31 and a compressive strength of 66,923 kN/m² (9,699 psi). The hardened cube was designated Sample I.

EXAMPLE 10

The procedure described in Example 1 above was performed with a mixture having 475 kilograms of Portland cement per cubic meter of mixture. A resulting hardened cube, designated Sample J, exhibited a compressive strength of 27,434 kN/m² (3,976 psi).

EXAMPLE 11

A mixture containing 475 kilograms of Portland cement per cubic meter of mixture was subjected to the procedure described in Example 2 above. A hardened cube, designated as Sample K, was produced having a water to cement ratio of 0.23 and a compressive strength of 71,380 kN/m² (10,345 psi).

EXAMPLE 12

The procedure described in Example 3 above was performed for a mixture which contained 475 kilograms of Portland cement per cubic meter of mixture. A hardened cube was produced, designated as Sample L, which had a water to cement ratio of 0.28 and a compressive strength of 64,812 kN/m² (9,393 psi).

COMMENTS REGARDING EXAMPLES 1-12

The results of Examples 1-12 are summarized in FIG. 4. For convenience, the samples are grouped according to their Portland cement content. By inspection of FIG. 4, it can be seen that compressive strengths in the range of about 28,000 kN/m² (4,000 psi) to about 77,000 kN/m² (11,200 psi) were obtained using mixtures having from 250 to 475 kilograms of Portland cement per cubic meter of mixture. Generally, the range of about 325 to about 400 kilograms of Portland cement per cubic meter of mixture produced the greatest compressive strength.

All of the concrete samples represented in FIG. 4 exhibited unexpectedly large compressive strengths, as compared to compressive strengths typically achieved using conventional wet curing methods. Moreover, FIG. 4 demonstrates that the concrete produced by the steam cycles of FIG. 2 and FIG. 3 have significantly higher compressive strengths than the concrete prepared by the steam cycle of FIG. 1.

EXAMPLE 13

A dry mixture was prepared which contained 400 kilograms of Portland Cement, 720 kilograms of river sand, and 1,080 kilograms of demolished brick per cubic meter of mixture. The mixture was agitated in a mixer without water for 3 minutes. Subsequently, the mixture was placed into a cube-shaped mold measuring four inches on each side. The mixture was placed in three layers, with each layer being rodded twenty-five times to promote compaction. The mold was weighed empty, and then again after the mixture had been placed and rodded.

The mold containing the mixture was sealed in an autoclave at atmospheric pressure and room temperature. Steam was injected into the autoclave to raise the temperature to about 170° C. Thereafter, steam was introduced into the autoclave as required to maintain the temperature in the range of 160° to 180° C. for a period of ten hours. During that period, the total pressure within the autoclave remained in the range of 6.3–10.4 kilograms per square centimeter. After ten hours of relatively constant temperature, steam injection was terminated and the autoclave was permitted to cool to room temperature over a period of 8 hours.

The mold, now containing a hardened concrete cube designated Sample M, was removed from the autoclave and weighed. A water to cement ratio of 0.3 was calculated for the hardened cube, based on the weights before and after steaming. Microscopic examination at 20 power magnification detected no microcracks in a saw cut surface of Sample M. Testing with a Shimadze Universal Testing Machine at a controlled strain rate of 0.0012 inches per minute revealed that the compressive strength of Sample M was 40,000 kN/m$^2$ (5,800 psi).

EXAMPLE 14

The procedure described in Example 13 above was repeated for a mixture containing 400 kilograms of Portland cement, 720 kilograms of river sand, and 1,080 of kilograms of broken concrete per cubic meter of mixture. A hardened cube was produced which was designated Sample N. Microscopic examination at 20 power of a saw-cut surface of Sample N detected no microcracks. A water to cement ratio was calculated as 0.3 for Sample N, based on weights recorded before and after steaming. Sample N tested at a compressive strength of 46,000 kN/m$^2$ (6,700 psi).

COMMENTS REGARDING EXAMPLES 13 AND 14

Examples 13 and 14 demonstrate that a dry-mix steam-injection process can produce relatively strong concrete from a mixture containing rubble, specifically demolished brick or broken concrete. The compressive strengths of 40,000 kN/m$^2$ (5,800 psi) and 46,000 kN/m$^2$ (6,700 psi), produced respectively by the demolished brick and the broken concrete containing mixtures, exceed the compressive strength of ordinary concrete commonly used in building construction, which is generally in the range of 20,000 to 35,000 kN/m$^2$. These results suggest that mixtures containing Portland cement and rubble can be converted into useful building materials. . . .

The above examples are presented to communicate the invention, and are not intended to limit the scope of the invention in any manner. Similarly, the invention is not limited to the specific embodiments which have been described. The teachings of this specification will undoubtedly suggest other, similar embodiments which are also within the scope of the appended claims.

I claim:

1. A method for making concrete from an initially dry mixture including portland cement, a fine aggregate, and a coarse aggregate, which method comprises the steps of:

introducing steam into the mixture, which steam contains less than 1% by weight of liquid phase water;

maintaining the steam in contact with the mixture approximately at saturation conditions for a time effective to hydrate substantially all of the cement; and injecting air into contact with the mixture and with the steam, while the steam is being maintained in contact with the mixture, so as to make concrete having a compressive strength of at least about 69,000 kN/m$^2$.

2. The method of claim 1 wherein the steam is maintained in contact with the mixture at a temperature in the range of about 160° to about 180° C.

3. The method of claim 1 wherein said concrete is hydrated substantially by contact with steam so as to minimize formation of calcium hydroxide by reaction with hydrolysis products.

4. A method for recycling previously used material to make concrete, which method comprises the steps of:

providing an initially dry mixture including portland cement, a fine aggregate, and a coarse aggregate being a comminuted, recycled material selected from the group consisting of demolished brick and broken concrete; and introducing steam into the mixture, which steam contains less than 1% by weight of liquid phase water; and maintaining the steam in contact with the mixture at approximately saturation conditions for a time effective to hydrate substantially all of the cement in the mixture, so as to make concrete having a compressive strength of at least about 35,000 kN/m$^2$.

5. The method of claim 4 wherein said coarse aggregate is comminuted demolished brick and wherein said concrete has a compressive strength of at least about 38,000 kN/m$^2$.

6. The method of claim 4 wherein said coarse aggregate is comminuted broken concrete and wherein said concrete has a compressive strength of at least about 41,000 kN/m$^2$.

7. The method of claim 4 wherein said concrete has a water to cement ratio equal to or less than about 0.3 by weight.

8. A concrete suitable for use as a building material, comprising:

a fine aggregate;

a coarse aggregate being a comminuted, recycled material selected from the group consisting of demolished brick and broken concrete; and a hydrated portland cement which is bound to the fine aggregate and to the coarse aggregate, wherein said concrete has a compressive strength of at least about 35,000 kN/m$^2$.

9. The concrete of claim 8 wherein said coarse aggregate is comminuted demolished brick and wherein said concrete has a compressive strength of at least about 38,000 kN/cm$^2$.

10. The concrete of claim 8 wherein said coarse aggregate is comminuted broken concrete and wherein said concrete has a compressive strength of at least about 41,000 kN/m$^2$.

11. The concrete of claim 8 wherein said concrete has a water to cement ratio equal to or less than about 0.3 by weight.

12. A concrete suitable for use as a building material, comprising:

a fine aggregate;

a coarse aggregate; and a portland cement present in an amount in the range of about 250 to about 325 kilograms per cubic meter, as measured in a dry mixture of the fine aggregate, the coarse aggregate, and the portland cement before hydration of the portland cement, the portland cement having been hydrated by contact with dry steam containing less than 1% by weight of liquid phase water;

said concrete having a compressive strength of at least about 62,000 kN/m$^2$.

13. The concrete of claim 12 wherein the portland cement is present in an amount of about 325 kilograms per cubic meter, as measured in a dry mixture of the fine aggregate, the coarse aggregate, and the portland cement before hydration of the portland cement, and wherein said concrete has a compressive strength of about 69,000 kN/m$^2$.

14. The concrete of claim 12 wherein said concrete has a water to cement ration equal to or less than about 0.3 by weight.

15. A method for making concrete suitable for use as a building material, which method comprises the steps of providing an initially dry mixture of a fine aggregate, a coarse aggregate, and portland cement, which portland cement is present in an amount in the range of about 250 to 325 kilograms per cubic meter of the initially dry mixture, and hydrating the portland cement in the dry mixture by contact with steam containing less than 1% by weight of liquid phase water so as to produce concrete having a compressive strength of about 62,000 kN/m$^2$.

16. The method of claim 15 wherein the portland cement is present in an amount of about 325 kilograms per cubic meter of the initially dry mixture and wherein the hydrating step produces concrete having a compressive strength of about 69,000 kN/m$^2$.

17. The method of claim 15 wherein the hydrating step is performed so that the produced concrete has a water to cement ratio of less than about 0.3 by weight.

* * * * *

UNITED STATES PATENT AND TRADEMARK OFFICE
CERTIFICATE OF CORRECTION

PATENT NO. :   5,328,508
DATED      :   July 12, 1994
INVENTOR(S) :
               Tung Dju Lin It is certified that error appears in the above-indentified patent and that said Letters Patent is hereby corrected as shown below:

Column 5, line 36, "kN/cm$^2$" should read --kN/m$^2$--.

Column 5, line 38, "0,030" should read --0.030--.

Signed and Sealed this

Twenty-seventh Day of September, 1994

Attest:

BRUCE LEHMAN

*Attesting Officer*   Commissioner of Patents and Trademarks